_United States Patent Office_

3,652,459
Patented Mar. 28, 1972

3,652,459
HYDROCRACKING CATALYST
R. Parthasarathy, Silver Spring, and Julius Scherzer and John L. Warthen, Baltimore, Md., assignors to W. R. Grace & Co., New York, N.Y.
No Drawing. Filed Feb. 25, 1970, Ser. No. 14,231
Int. Cl. B01j 11/40; C01b 33/28
U.S. Cl. 252—455 Z            3 Claims

ABSTRACT OF THE DISCLOSURE

A nickel oxide promoted hydrocracking catalyst having a base consisting of partially chromium exchanged calcined faujasite combined with an inorganic matrix. The activity of the catalyst remains essentially constant over extended periods of use.

---

The present invention relates to zeolite containing hydrocracking catalysts, and more specifically to improved faujasite promoted nickel oxide containing hydrocracking catalysts having a high degree of activity and stability.

It is generally known that active hydrocracking catalysts may be prepared by combining a Group VI or Group VIII metal oxide promoter, and from about 10 to 15 percent by weight of a stable faujasite with an amorphous matrix material such as synthetic silica alumina. Stabilized faujasites used in preparing typical prior catalysts include hydrogen and Group IB to Group VIII metal exchanged type X and type Y zeolites having silica to alumina ratios ranging from 2.5 to 6. Metal promoters such as chromium, nickel, cobalt, molybdenum, oxides thereof have been added to hydrocracking catalysts in amounts ranging from about 2 to 30 percent by weight.

Many prior art faujasite containing metal promoter hydrocracking catalysts exhibit a high degree of initial activity and selectivity. However, it is frequently found that these catalysts lose activity at a relatively rapid rate when subjected to commercial hydrocracking conditions. To reestablish the relatively high initial activity of the prior art hydrocracking catalysts, frequent regeneration is required. Obviously, frequent regeneration results in loss of overall hydrocracking capacity and efficiency in a given commercial unit.

It is therefore an object of the present invention to provide an improved hydrocracking catalyst.

It is another object to provide a faujasite containing hydrocracking catalyst which exhibits a high degree of activity over extended periods of use.

These and still further objects of the present invention will become readily apparent to one skilled in the art from the following detailed description and specific examples.

Broadly, our invention contemplates a hydrocracking catalyst which comprises nickel oxide deposited upon a catalytic base which consists of a partially chromium exchanged calcined faujasite combined with an essentially amorphous inorganic oxide matrix.

More specifically, we have found that a highly active and stable hydrocracking catalyst may be prepared by combining from about 2.0 to 15.0 percent by weight nickel oxide based on the weight of the overall catalyst with a catalyst support material which comprises (a) from about 10 to 90 percent by weight of a partially chromium exchanged calcined faujasite (hereinafter frequently referred to as PCY-Cr) mixed with (b) from about 10 to 90 percent by weight of an essentially amorphous inorganic oxide matrix.

The partially chromium exchanged calcined faujasite utilized in the practice of the present invention is prepared from a conventional alkali metal faujasite having a silica to alumina ratio of from about 3 to 6. Faujasites which are suitable are readily available from commercial sources and identified as sodium type Y molecular sieves. The first step involved in the preparation of the partially chromium exchanged faujasite involves ammonium exchanging and alkali metal faujasites using a solution of an ammonium salt. Preferably ammonium sulfate solutions containing from about 5 to 15 weight percent ammonium sulfate are found to be satisfactory. The exchange is conducted at a temperature of from about 80 to 100° C. for a period of 1 to 3 hours to obtain a partially ammonium exchanged faujasite which contains from about 2 to 4 percent alkali metal oxide. The partially ammonium exchanged faujasite is then calcined at a temperature of from about 800 to 1500° F. for a period of 1 to 3 hours.

Subsequent to the calcination step, the partially ammonium exchanged faujasite, which has been partially converted to hydrogen form by calcination, is subjected to exchange with a suitable chromium salt solution. Preferably a chromium chloride solution is used which contains from about 0.01 to 0.1 mole chromium chloride per liter. The pH of the chromium exchange solution is preferably adjusted to about 3.0 to 4.5 by the addition of a suitable mineral acid such as hydrochloric acid. Normally it is found that a desirable amount of chromium ion is exchanged into the faujasite within a period of from about 0.5 to 2 hours when the exchange is conducted at a temperature of from about 70 to 100° C. Preferably the partially chromium exchanged calcined faujasite will contain approximately 0.5 to 5 percent by weight chromium, determined as chromium oxide, and a residual alkali metal oxide content, normally $Na_2O$, of from about 0.3 to 1.5 percent by weight.

Subsequent to chromium exchange, the faujasite is subjected to the second calcination at a temperature of from 800 to 1500° F. for a period of about 1 to 3 hours. After the second calcination the faujasite is then exchanged with an aqueous solution of ammonium sulfate to remove residual sodium ion. Ammonium sulfate solutions containing from about 0.4 to 1.5 moles ammonium sulfate per liter maintained at a temperature of about 80 to 100° C. are preferred. The ammonium sulfate exchanged sieve is then washed with water to remove sulfate, and subsequently dried at a temperature of 200 to 250° F. The partially chromium exchanged faujasite (PCY-Cr) prepared by the above described procedure will possess a surface area of about 700 m.²/g. subsequent to a 2 hour 1000° F. thermal treatment. Furthermore, after a 2 hour 1650° F. treatment the PCY-Cr will retain a surface area on the order of 600 m.²/g.

The presently described catalyst contains an amorphous matrix which is admixed with the above defined PCY-Cr. The amorphous matrix portion of the catalyst may be a synthetic alumina, silica, or silica-alumina hydrogel. The preferred (amorphous) matrix component is silica-alumina hydrogel which is prepared by gelling silicate and aluminate using typical prior art procedures.. A particularly suitable matrix component comprises a synthetic silica-alumina hydrogel containing from about 10 to 40 percent by weight alumina. This silica-alumina hydrogel is prepared by first gelling a sodium silicate solution with carbon dioxide or a mineral acid, and subsequently adding aluminum salt, such as aluminum sulfate, to provide the required alumina concentration. The matrix material will possess a total pore volume on the order of 0.6 to 0.85 cc. per gram and a surface area on the order of 300 to 500 meters ²/g.

To prepare the catalyst support or base which comprises the partially chromium exchange faujasite admixed with the matrix material, the faujasite is thoroughly admixed with the matrix component under conditions of vigorous physical mixing. Typically, the PCY-Cr is mixed with the hydrogel in a ball mill for a period of from about 2 to 16 hours. In a preferred practice of the present invention catalyst support contains approximately 10 to 50 parts by weight PCY-Cr per part by weight inorganic matrix.

To obtain the finished catalyst which is impregnated to from about 2 to 15 percent by weight nickel oxide, the catalyst support material is preferably impregnated with the solution of a soluble nickel salt. Subsequent to impregnation the mixture is further ball milled to obtain a uniform product. Nickel solutions are prepared using soluble nickel salts such as nickel acetate, nitrate, formate, and sulfate dissolved in sufficient water to provide the desired nickel content so as to homogeneously impregnate the support to incipient wetness.

Subsequent to impregnating the support material the catalyst is dried and preferably formed into pills or pellets having a diameter of from about ⅛ to ¼ inch. During the pilling procedure it is advantageous to add a pilling aid such as Sterotex. Subsequent to pilling, the catalyst is calcined at about 1000 to 1100° F. for 3 to 6 hours, then sized to the desired particle size range.

The hydrocracking catalyst prepared in accordance with the present invention is readily utilized in conventional hydrocracking procedures. Typically, the hydrocracking conditions employed in the use of the present catalyst involves temperatures of from about 300 to 900° F., pressures on the order of 500 to 3000 p.s.i.g., space velocities ranging from 0.5 to 5.0 volumes of feed per hour per volume of catalyst (LHSV), and hydrogen to hydrocarbon mole ratios on the order of from about 10 to 50.

The hydrocarbons used as a feedstock in the hydrocracking processes, which employ the present catalyst, may constitute substantially any hydrocarbon feeds except those which possess a completely aromatic nature and no alkyl groups. Feedstocks of particular utility include straight run gas oils boiling on a range of about 400 to 800° F., cycle oils from conventional cracking operations which boil in the above-mentioned gas oil range, heavy naphtha fractions and alkyl aromatic hydrocarbons in general. The process is especially valuable for converting light and heavy gas oils or naphtha, which boil in the gasoline range, to premium quality products. When highly aromatic feedstock is treated it is preferred to use more or less severe conditions, for example temperatures in the range of 600 to 900° F. When the feedstock consists primarily of paraffinic and naphthenic hydrocarbons, it is preferred to use somewhat lower temperatures on the order of 500 to 800° F.

It is found that the hydrocarbons which will hydrocrack in the presence of the catalyst described herein are converted into desirable hydrocarbon derivatives of lower molecular weight. Catalysts are found to exhibit exceptionally high activity at relatively low temperatures on the order of 600° F., and furthermore, it is found that the activity of the present catalyst remains essentially constant over extended periods of use.

Having described the basic aspects of the present invention the following examples are given to illustrate specific embodiments thereof.

EXAMPLE I

A sodium type Y faujasite having a silica-alumina ratio of about 5.3 was exchanged with an ammonium sulfate solution at a temperature of 212° F. for 2 hours to obtain a partially ammonium exchanged faujasite having a sodium content of about 3.1 percent $Na_2O$. The ammonium sulfate solution contained 0.75 mole of ammonium sulfate per liter. The exchanged sieve was then calcined at 1400° F. for 3 hours. 60 grams of the calcined sieve was then slurried with 300 ml. of water. The resultant slurry was blended with a solution containing 6 grams of chromium chloride ($CrCl_3 \cdot 6H_2O$) dissolved in 300 ml. of water. The pH of the mixture was then adjusted to 3.5 using dilute hydrochloric acid. The entire mixture was heated to 175° F. and maintained at that temperature for 1 hour with stirring. The sieve was then recovered by filtration, and the resultant filtercake was washed with 400 ml. of water acidified with dilute hydrochloric acid to a pH of about 4.4. The cake was then washed chloride free with distilled water and oven dried at 220° F. This material was then calcined at 1400° F. for 3 hours, ammonium sulfate treated twice with 500 ml. of 10 percent aqueous ammonium sulfate solution at boiling, filtered, washed sulfate free, and oven dried at 220° F. The resultant PCY-Cr sieve possessed the following characteristics: surface area after 1000° F. 2 hour treatment, 716 m.$^2$/g.; surface area after 1650° F. for 2 hours, 610 m.$^2$/g.; $Cr_2O_3$, 1.11%; $Na_2O$, 0.18%; $SiO_2/Al_2O_3$, 5.3.

EXAMPLE II

A 20.25 g. sample of the PCY-Cr prepared by way of Example I was combined with 108.8 grams of silica-alumina hydrogel which contained 13 percent by weight alumina (26.7 percent volatiles). This mixture was placed in a ball mill and milled for 16 hours. The milled product was then impregnated with an aqueous solution of nickel acetate which contained 9 grams $Ni(C_2H_5O_2 \cdot 4H_2O)$ dissolved in 60 cc. of water. The mixture was blended in a Waring Blendor, and subsequently placed in a ball mill for 16 hours. The milled product was dried for 6 hours at 280° F., and then combined with 5.2 g. Sterotex. This mixture was formed into ⅜ x ⅛ pills, calcined for 3 hours at 1000° F., and sized to a 14 to 20 mesh size range. The finished composition contained 2.6 percent by weight NiO, 19.5 percent by weight PCY-Cr ($SiO_2$—$Al_2O_3$), 0.20 percent $Cr_2O_3$, and 77.7 percent amorphous silica-alumina.

EXAMPLE III

To compare the catalyst of the present invention which was prepared by way of Example II, a similar catalyst composition was prepared which contained a nickel exchanged faujasite, in lieu of the preferred chromium exchanged faujasite. The nickel exchanged faujasite was prepared by the following procedure:

A sodium type Y faujasite having a silica-alumina ratio of about 4.5 was exchanged with an ammonium sulfate solution at a temperature of about 212° F. for about an hour to obtain a partially ammonium exchanged faujasite having a sodium content of about 3.5 percent $Na_2O$. The exchanged sieve was then calcined at 1000° F. for 3 hours. The partially ammonium exchanged faujasite was given a second ammonium sulfate exchange in the same manner as described earlier at 212° F. for about 3 hours. The slurry was filtered and exchanged a third time as above for about an hour. The resulting slurry was filtered and washed free of $SO_4$ with hot deionized water, filtered and dried. The $Na_2O$ content of the dried, exchanged sieve was about 0.3 percent. The dried sieve was given a nickel ion exchange using a nickel hexamine chloride solution containing 0.5 molar $Ni^{2+}$ ions for about 2 hours at ambient temperature. The slurry was filtered and washed with a 2 percent ammonium hydroxide solution until the filtrate was colorless. This $Ni^{++}$ exchange procedure was repeated two more times to give about 8 percent NiO in the exchanged sieve. This nickel sieve was oven dried at 110° C. for 2 hours and calcined at 1400° F. for 3 hours. The calcined nickel exchanged faujasite had a surface area of about 800 m.$^2$/g. and $Na_2O$ content of less than 0.1 wt. percent.

EXAMPLE IV

A hydrocracking catalyst was prepared from the nickel faujasite prepared by way of Example III by mixing 40.8 grams of the nickel faujasite of Example III with 219 grams of amorphous silica alumina hydrogel which contained 13 percent by weight alumina (26.7% volatiles).

The mixture was ball milled for 6 hours, and subsequently combined with 7.0 grams of nickel acetate $$Ni(C_2H_3O_2)_2 \cdot 4H_2O$$

dissolved in 140 cc. of water. The mixture was ball milled for 7 hours and subsequently dried for 16 hours at 270° F. The dried product was combined with 4 percent by weight Sterotex and formed into 1/8 x 1/8 pills. The pills were then calcined for 3 hours at 1000° F., and sized to a range of 14 to 20 mesh. The resultant catalyst contained the following: 36.48 g. Ni-Y sieve (silica-alumina basis) (18%); 5.62 g. NiO (2.78%); 160.00 g. amorphous silica alumina hydrogel.

EXAMPLE V

To illustrate the superiority of the presently contemplated hydrocracking catalyst prepared by way of Example II with the typical prior art hydrocracking catalysts prepared by way of Example IV, samples of these catalysts were tested under identical conditions. The tests utilized a virgin gas oil boiling in the range of 422 to 643° F. A hydrogen pressure of 1250 p.s.i.g. and a hydrogen to hydrocarbon ratio of 25 was used. The following data was accumulated:

| Catalyst | Example IV (Ni-Y) | Example II (PCY-Cr) |
|---|---|---|
| Initial deactivation (° F./1st 24 hrs.) | 75 | 100 |
| Deactivation at constant conversion over 100 hrs. operation (° F./24 hrs.) | 2 | 0.5 |
| Average operation temp. after 100 hrs. (° F.) | 680 | 675 |
| Conversion (wt. percent) | 69 | 69 |
| H naphtha yield (wt. percent) | 61 | 60 |

The above data clearly indicates that the performance of the catalyst of the present invention, i.e. the catalyst of Example II, is substantially greater than that of the typical prior art catalyst, i.e. that of Example IV. This is revealed in the fact that after an initial deactivation procedure, the deactivation of the catalyst of Example IV (prior art) in terms of degrees F. for each 24 hours of operation at constant conversion is almost 4 times that of the Example II catalyst of the present invention. This is evidenced by the fact that a temperature increase of more than 2° F. for each 24 hours of operation was required to maintain constant conversion for the prior art catalyst as opposed to less than 0.5° F. for each 24 hours of operation required for the catalyst claimed herein.

The preceding examples and data clearly indicate that a superior hydrocracking catalyst may be prepared by way of the teachings of the present invention.

We claim:
1. A hydrocracking catalyst comprising from about 2 to 15% by weight nickel expressed as nickel oxide deposited upon a catalyst base, said base comprising:
   (a) about 10 to 90% by weight of a partially chromium exchanged faujasite being prepared by:
      (1) ammonium exchanging an alkali metal faujasite having a silica to alumina ratio of greater than about 3 to obtain a faujasite having less than 4% by weight alkali metal oxide,
      (2) calcining said exchanged faujasite at a temperature of from about 800 to 1500° F. for a period of from about 1 to 3 hours,
      (3) exchanging said calcined faujasite with a chromium salt solution to impart a chromium ion concentration of from about 0.5 to 5% by weight measured as $Cr_2O_3$,
      (4) calcining said chromium exchanged faujasite at a temperature of 800 to 1500° F. for a period of about 1 to 3 hours, and
      (5) reducing the alkali metal oxide content of said faujasite to below about 1.0% by weight by exchanging with ammonium ion; and
   (b) about 90 to 10% by weight of an essentially amorphous inorganic oxide matrix.

2. The catalyst of claim 1 wherein said matrix comprises synthetic silica-alumina hydrogel containing from about 10 to 40 percent by weight alumina.

3. The catalyst composition of claim 1 wherein said faujasite possesses a silica to alumina ratio of from about 3 to 6.

References Cited

UNITED STATES PATENTS

| 3,344,058 | 9/1967 | Miale | 208—111 |
| 3,450,626 | 6/1969 | Wight et al. | 252—455 X |
| 3,507,812 | 4/1970 | Smith et al. | 252—455 |
| 3,457,191 | 7/1969 | Erickson et al. | 252—455 |

CARL F. DEES, Primary Examiner

U.S. Cl. X.R.

23—112